US012749978B2

(12) United States Patent
Bumgarner et al.

(10) Patent No.: US 12,749,978 B2
(45) Date of Patent: Sep. 29, 2026

(54) POWER STAGE CONTROLLER

(71) Applicant: Renesas Electronics Corporation, Tokyo (JP)

(72) Inventors: Adam Matthew Bumgarner, Duluth, GA (US); Benoit Labbe, Harlow (GB)

(73) Assignee: Renesas Electronics Corporation, Tokyo (JP)

( * ) Notice: Subject to any disclaimer, the term of this patent is extended or adjusted under 35 U.S.C. 154(b) by 335 days.

(21) Appl. No.: 18/538,096

(22) Filed: Dec. 13, 2023

(65) Prior Publication Data

US 2025/0202365 A1 Jun. 19, 2025

(51) Int. Cl.

*H02M 3/158* (2006.01)
*H02M 1/00* (2006.01)
*H02M 3/157* (2006.01)

(52) U.S. Cl.

CPC ....... *H02M 3/1584* (2013.01); *H02M 1/0025* (2021.05); *H02M 3/157* (2013.01)

(58) Field of Classification Search

CPC .. H02M 3/1584; H02M 3/1586; H02M 3/157; H02M 1/0025

See application file for complete search history.

(56) References Cited

U.S. PATENT DOCUMENTS

2005/0012492 A1* 1/2005 Mihalka .................. H02J 1/102 323/272
2010/0148738 A1* 6/2010 Schiff ................. H02M 3/1584 323/282

OTHER PUBLICATIONS

Datasheet ISL69127 "Digital Dual Output 6+1-Phase VR13 PWM Controller", Jan. 2018, Renesas Electronics. 2 pages. https://renesas.com/us/en/document/sds/isl69127-data-short.

(Continued)

*Primary Examiner* — Alex Torres-Rivera

(74) *Attorney, Agent, or Firm* — SCULLY, SCOTT, MURPHY & PRESSER, P.C.

(57) ABSTRACT

A controller for controlling a power stage having a plurality of phases is presented. The controller generates a control signal; sends the control signal to the plurality of phases via a first link; receives from each phase a feedback signal via a second link; sums the plurality of feedback signals and derives an average current per phase.

18 Claims, 13 Drawing Sheets

(56) References Cited

OTHER PUBLICATIONS

Datasheet ISL99227, “Smart Power Stage (SPS) Module with Integrated High Accuracy Current and Temperature Monitors”, Nov. 2023, Renesas Electronics. 18 pages, https://www.renesas.com/us/en/document/dst/isl99227-isl99227b-datasheet.

Datasheet “Synchronous-Buck Power Stage”, Dec. 2012, Texas Instruments; and datasheet “Digital PWM System Controller with 4-bit, 6-bit, or 8-bit VID Support”, Feb. 2011, Texas Instrument. 30 pages. https://www.ti.com/lit/ds/symlink/ucd74106.pdf?ts=1700474265228&ref_url=https%253A%252F%252Fwww.ti.com%252Fproduct%252FUCD74106.

Datasheet “Synchronous-Buck Power Stage”, Dec. 2012, Texas Instruments; and datasheet “Digital PWM System Controller with 4-bit, 6-bit, or 8-bit VID Support”, Feb. 2011, Texas Instrument. 40 pages, https://www.ti.com/lit/ds/symlink/ucd9244.pdf?ts=1700474371913&ref_url=https%253A%252F%252Fwww.ti.com%252Fproduct%252FUCD9244.

Khomenko, D. Sokolov, A. Mokhov and A. Yakovlev, “WAITX: An Arbiter for Non-persistent Signals” 2017 23rd IEEE International Symposium on Asynchronous Circuits and Systems (ASYNC), San Diego, CA, USA, 2017.

P91E0A (product page), “Programmable Multi-Channel PMIC Solution for Intel Broxton Atom™”, downloaded on Jun. 10, 2025. 4 pages. https://www.renesas.com/eu/en/products/power-power-management/multi-channel-power-management-ics-pmics/ssdsoc-power-management-ics-pmic-and-pmus/p91e0a-programmable-multi-channel-pmic-solution-intel-broxton-atom.

P9148A (product page). “Distributed Power Unit for P91E0A”, downloaded on Jun. 10, 2025. 4 pages. https://www.renesas.com/eu/en/products/power-power-management/multi-channel-power-management-ics-pmics/ssdsoc-power-management-ics-pmic-and-pmus/p9148a-distributed-power-unit-p91e0a.

* cited by examiner

POWER STAGE CONTROLLER

TECHNICAL FIELD

The present disclosure relates to a controller for controlling a power stage having a plurality of phases. The disclosure also relates to a power supply comprising such a controller, coupled to a power stage having a plurality of phases.

BACKGROUND

Controlling external power modules via a single remote controller allows for improved power-planning of the application circuit board. The power conversion modules can be placed close to the load, while the control circuit can be integrated as part of a larger power management circuit (PMIC). This configuration increases the power handling capability of the PMIC whilst not increasing the power dissipation of the circuit. Most of the power dissipated by the power converter is dissipated in the remote power module. This reduces the constraints on the power envelope of the PMIC as well.

The driver-plus-MOSFET (DrMos) power stage introduces a standard interface of power-module intended to supply power to large digital systems. An example implementation of a DrMos is shown in FIG. 1. The ISL69127 controller and the ISL99227 smart power modules can be employed in a similar way, allowing for a high-performance current power conversion system, as shown in FIG. 1 (see datasheet ISL69127 “Digital Dual Output 6+1-Phase VR13 PWM Controller”, January 2018, Renesas Electronics and datasheet ISL99227, “Smart Power Stage (SPS) Module with Integrated High Accuracy Current and Temperature Monitors”, November 2023, Renesas Electronics). This type of power stage is primarily geared toward high power systems but can be adapted to lower power systems, freeing large PMICs from the power dissipation of several power conversion rails. Lower power modules such as the UCD74106 and associated controller UCD9244 offer a scalable power management platform while using a similar interface than the DrMos interface (see datasheet “Synchronous-Buck Power Stage”, December 2012, Texas Instruments; and datasheet “Digital PWM System Controller with 4-bit, 6-bit, or 8-bit VID Support”, February 2011, Texas Instrument).

For systems like the one shown in FIG. 1, the large pin-count of the control to power-module interface increases complexity of the board design as well as added pin cost for the power modules. Proposed dual single-wire interfaces can be employed, like the ones shown in FIG. 2. The P91E0A PMIC can be connected to a P9148A power stage through a simplified interface using a switching control interface DIF, and a general-purpose control interface DIO, as can be seen in FIG. 2. However, current DIF, DIO interfaces suffer from limited bandwidth and a general communication latency which degrades the performance of the power supply. Thus, an overhaul of the control to power-stage interfaces with a simplified protocol that reduces the bus latency and increases the transient performance of the power supply whilst still having simple design is required.

It is an object of the disclosure to address one or more of the above-mentioned limitations.

SUMMARY

According to a first aspect of the disclosure, there is provided a controller for controlling a power stage having a plurality of phases, the controller being configured to: generate a control signal; send the control signal to the plurality of phases via a first link; receive from each phase a feedback signal via a second link; sum the plurality of feedback signals and derive an average current per phase.

Optionally, the controller having a first port connected to the first link and a second port connected to the second link, and a resistance circuit coupled to the second port, the resistance circuit having a plurality of resistances coupled in parallel, each resistance being connected to ground via a corresponding switch. For instance, the number of resistances may be the same or greater than the number of phases.

Optionally, wherein the resistance circuit comprises an additional switch for performing a phase address reading functionality.

Optionally, wherein the control signal comprises one or more of a first pulse having a first pulse-width for activating a first phase; a second pulse having a second pulse-width for activating additional phases incrementally; a third pulse having a third pulse-width for de-activating all phases; a fourth pulse having a fourth pulse-width for initiating each phase to read its own address.

Optionally, wherein the first link and the second link are unidirectional links.

Optionally, wherein the sum of the feedback signals is proportional to an output current generated by the plurality of phases.

Optionally, wherein the controller is further configured to generate a configuration signal for configuring one or more phases, the configuration signal being transmittable via a third link. For instance, the configuration signal may be configured to activate turn-off during a zero crossing detection of the inductor, or to set the current limit for the phase.

According to a second aspect of the disclosure there is provided a power supply comprising the controller according to the first aspect, coupled to a power stage having a plurality of phases.

Optionally, wherein the controller is coupled to the power stage via a single wire interface.

Optionally, wherein each phase comprises a decoder for decoding the control signal.

Optionally, wherein the decoder comprises a finite state machine coupled to a phase counter and a logic circuit; wherein the finite state machine is configured to execute a decoding protocol.

Optionally, wherein the logic circuit comprises an arbiter coupled to one or more wait cells.

Optionally, wherein each phase comprises an address reader configured to read an address of the phase by sending a current through an address resistance.

Optionally, wherein the address reader comprises a logic circuit configured to initiate a read sequence.

Optionally, wherein the address reader comprises a compensator circuit configured to compensate for an error generated by the address resistance. For instance, the compensator circuit may include a current-controller voltage shifter using an operational amplifier.

Optionally, wherein the decoder is configured to measure the pulse-width of each pulse in the control signal; and perform an associated protocol based on the measurement.

According to a third aspect of the disclosure there is provided a method of controlling the power stage according to the second aspect of the disclosure having a plurality of phases, the method comprising: generating a control signal comprising a series of pulses; sending the control signal to the plurality of phases via a first link; and for each phase decoding the control signal and activating or de-activating the phase based on the control signal; receiving via a second link a feedback signal from each phase; summing the plurality of feedback signals and deriving an average current per phase.

Optionally, wherein the control signal comprises one or more of a first pulse having a first pulse-width for activating a first phase; a second pulse having a second pulse-width for activating additional phases incrementally; a third pulse having a third pulse-width for de-activating all phases; a fourth pulse having a fourth pulse-width for initiating each phase to read its own address.

DESCRIPTION OF THE DRAWINGS

The disclosure is described in further detail below by way of example and with reference to the accompanying drawings, in which.

DESCRIPTION

Figure 1:
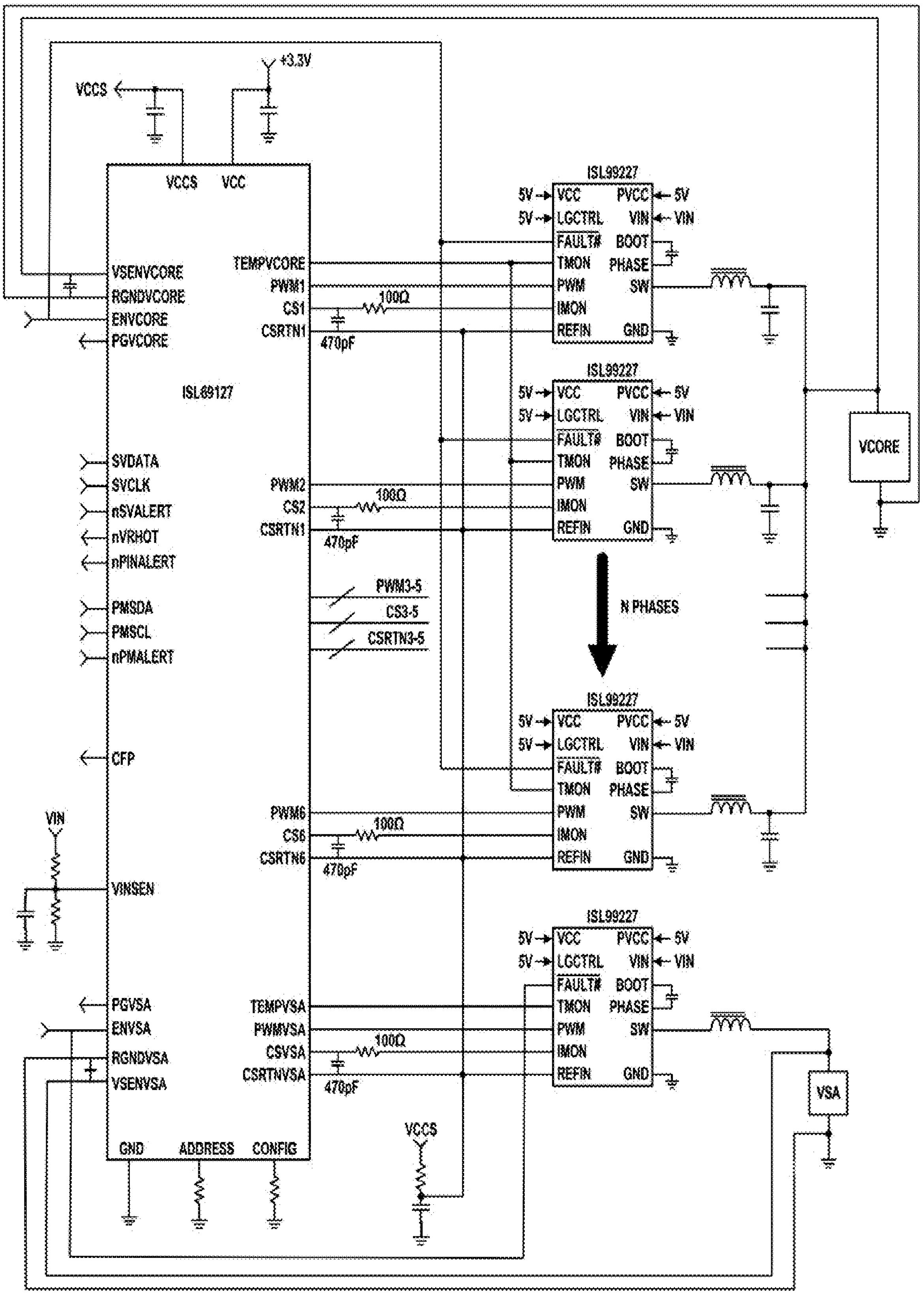
FIG. 1 (PRIOR ART)
FIG. 1 is a diagram of a power supply circuit that uses a conventional power stage and controller.

FIG. 1 is a diagram of a power supply circuit that uses a conventional power stage with a plurality of smart power phases (see datasheet ISL99227, "Smart Power Stage (SPS) Module with Integrated High Accuracy Current and Temperature Monitors", November 2023, Renesas Electronics) and a controller (see datasheet ISL69127 "Digital Dual Output 6+1-Phase VR13 PWM Controller", January 2018, Renesas Electronics). The circuit shown is a power stage solution that can be configured for DC/DC power conversion. This is circuit includes a standard interface for power-phases in large digital systems.

Figure 2:
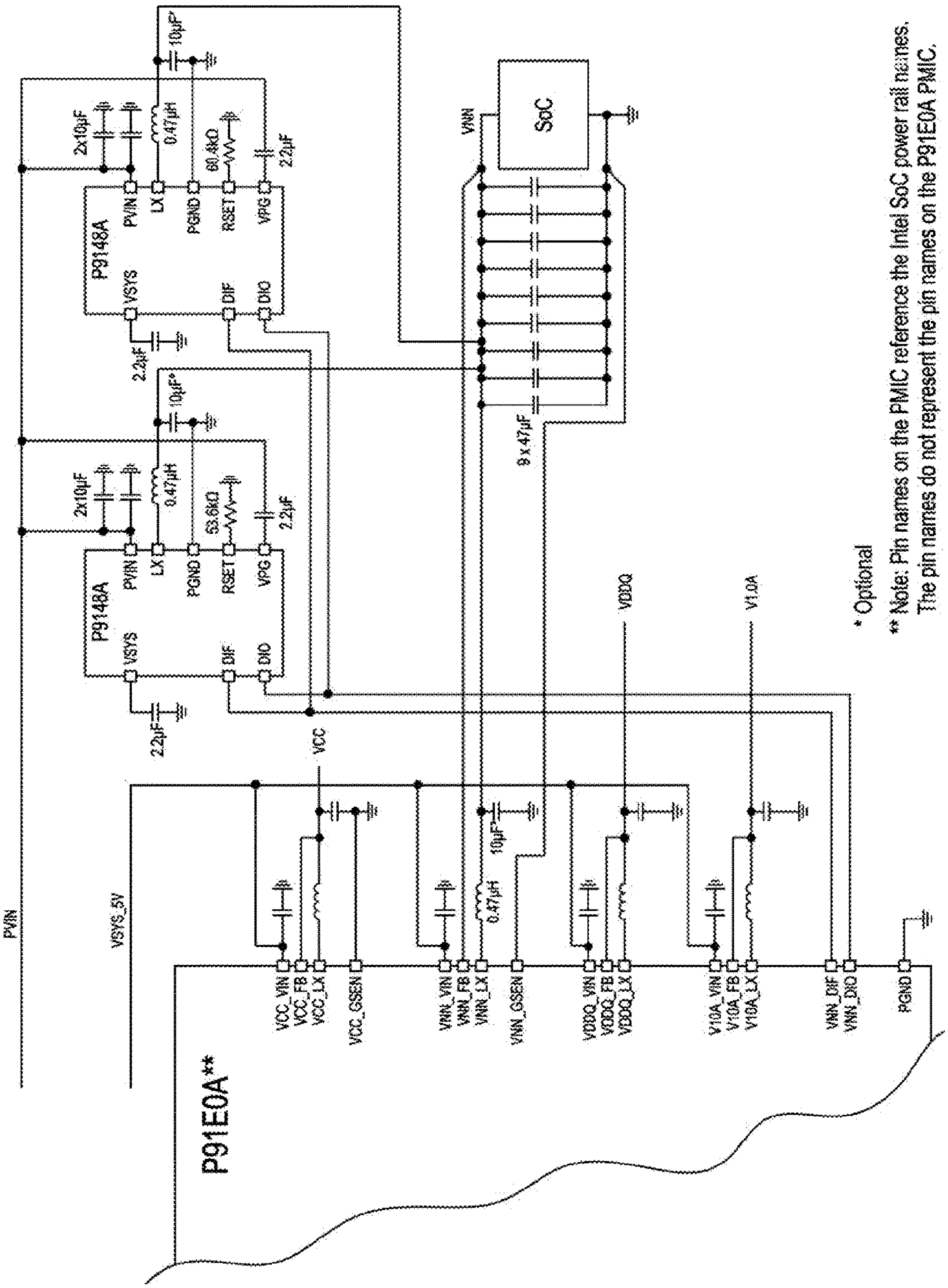
FIG. 2 (PRIOR ART)
FIG. 2 is a diagram of a known dual single-wire interface that can be used with the power management circuit of FIG. 1.

FIG. 2 is a diagram of a known dual single-wire interface that can be used with the power supply of FIG. 1. This interface allows for the controller to be connected to the phases with a standard control interface such as a digital interface (DIF) and a general purpose control interface such as a Digital Input/Output (DIO). Whilst implementing the interface set up of FIG. 2 into a circuit as shown in FIG. 1 can help reduce the complexity of the circuit design, the DIF and DIO interfaces implemented in FIG. 2 suffer from limited bandwidth and a general communication latency. This results in a reduced performance of the power supply circuit.

Figure 3:
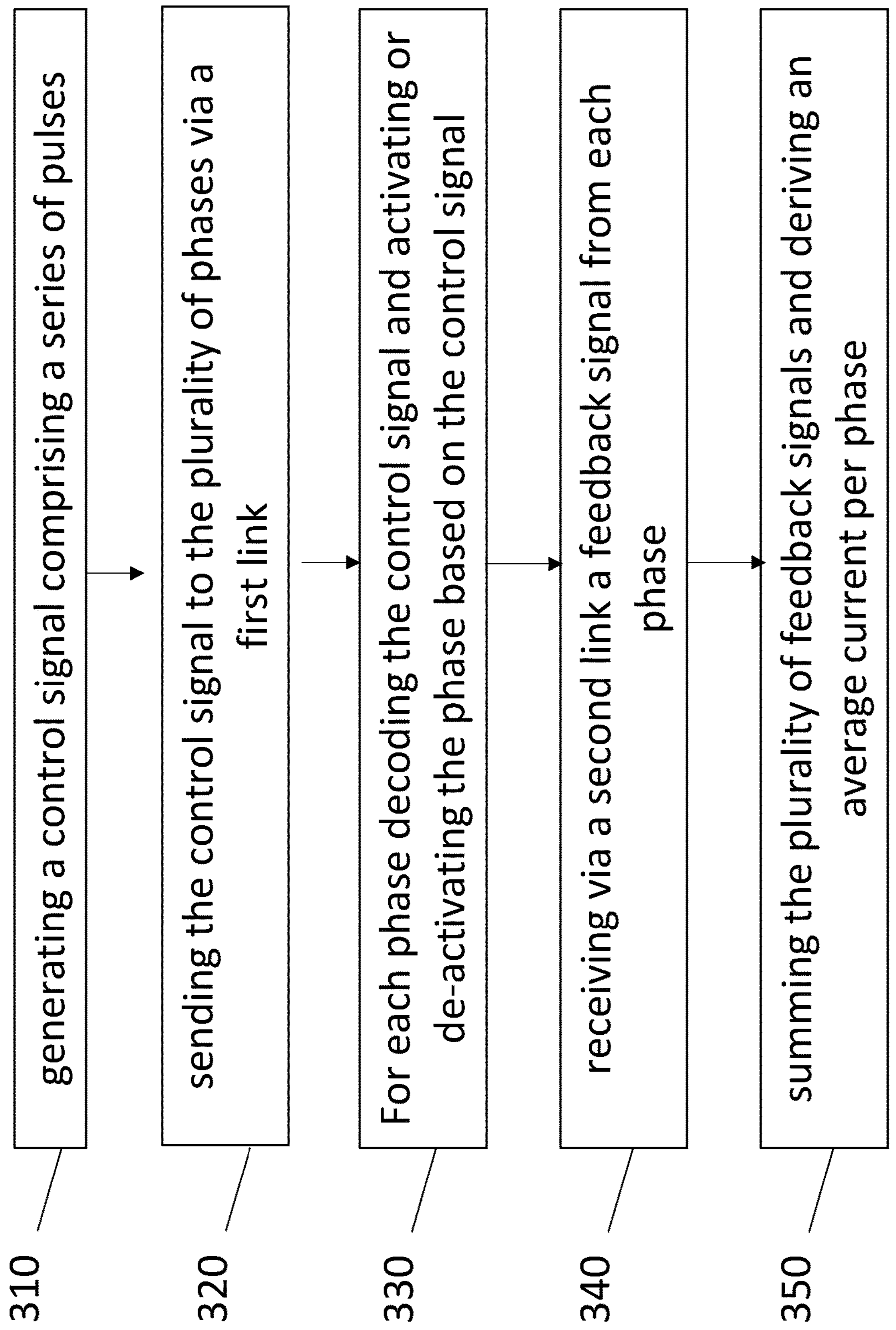
FIG. 3 is a method for controlling a power stage according to the disclosure.

FIG. 3 is a flow chart of a method for controlling a power stage having a plurality of phases according to disclosure. This method includes steps 310 to 350.

At step 310 a controller generates a control signal. The control signal comprises a series of pulses. At step 320 the controller sends the control signal to the plurality of phases via a first link. The first link could be, for example, a unidirectional link.

At step 330, for each phase the control signal is decoded, and the phase either activated or de-activated based on the control signal. For instance, the control signal may either activate or de-activate the phase depending on the configuration of pulses in the control signal.

At step 340, the controller receives a feedback signal from each phase via a second link. The second link could also be, for example, a unidirectional link. Finally, in step 350, the controller sums the plurality of feedback signals and derives an average current per phase. This average current per phase may be used to balance the current across the plurality of phases in the power stage.

Figure 4:
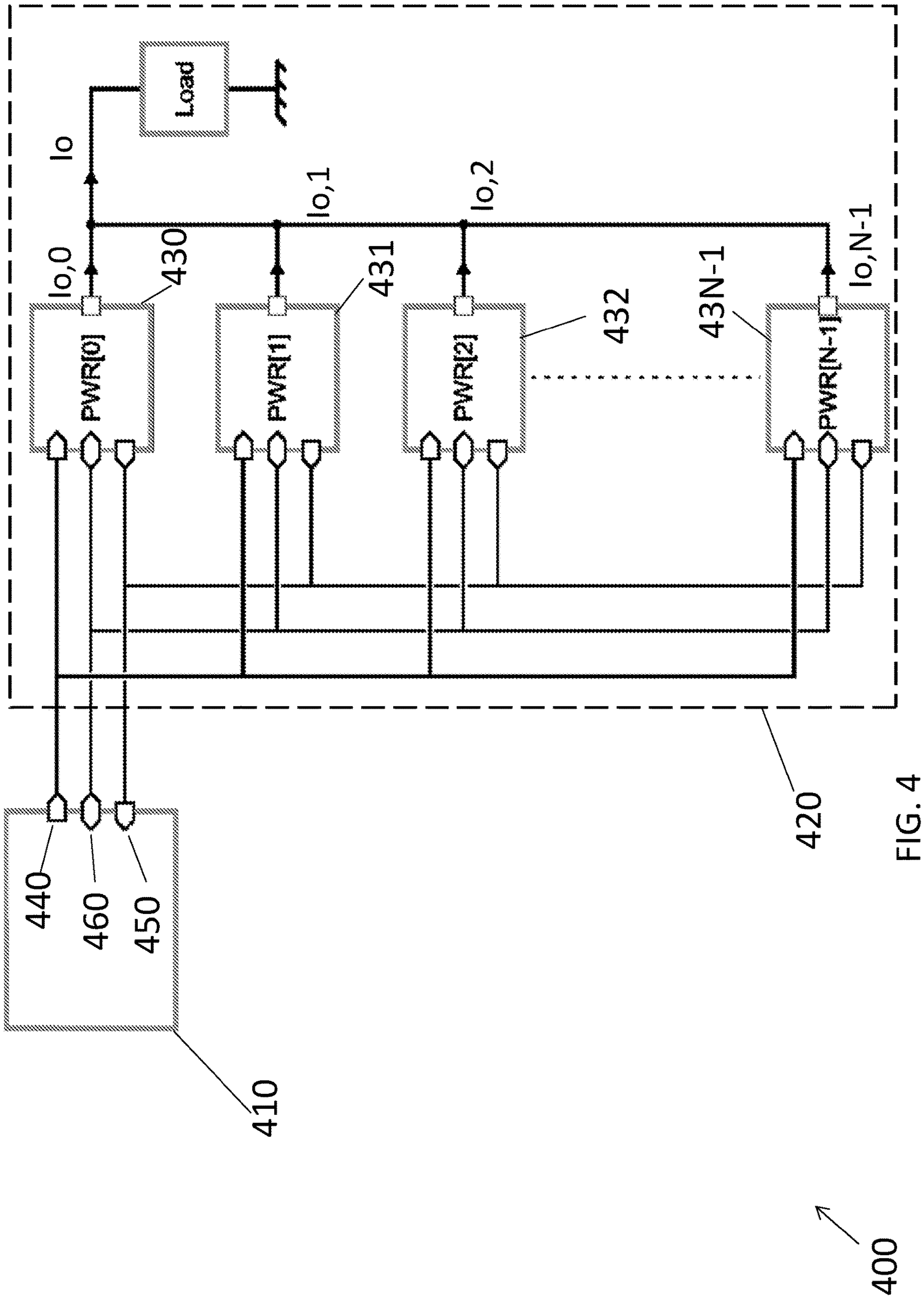
FIG. 4 is a diagram of a power supply according to the disclosure.

FIG. 4 is a diagram of a power supply 400 according to the present disclosure. The power supply comprises a controller 410 and a power stage 420 having a plurality N of phases labelled 430, 431 . . . 43N−1. The controller 410 controls the power stage 420 using the method as outlined in FIG. 3. The controller 410 comprises a first port connected to a first link 440 and a second port connected to a second link 450. Each phase in the plurality of phases is connected to the controller via both the first link 440 and second link 450. Both the first and second link could be, for example, unidirectional links. The controller 410 and the power stage 420 can be coupled via a single-wire interface also.

The controller 410 is configured to control the power stage 420 having a plurality of phases. The controller 410 generates a control signal which is transmitted to the plurality of phases via the first link 440. Each phase receives the control signal and decodes the signal. Based on the decoded control signal, each phase will either be activated or deactivated. Each phase has its own unique address. In this example, the first phase 430 have an address of 0, the second phase 431 has an address 1 and the Nth phase 43N−1 has an address N−1. This address is assigned during the start-up of the power supply 400 and is described in more detail below.

Each phase generates a feedback signal and an output current. For example, the phase 430 generates the output current Iout,0, the phase 431 generates the output Iout,1. The total output current Iout which is received at the Load is a summation of each of the individual output currents from each phase in the plurality of phases. The controller 410 is configured to receive, via the second link 450, the feedback signal from each phase. The controller 410 then sums over the plurality of feedback signals to derive an average current per phase. This average current per phase is proportional to the output current of each phase. Therefore, the controller 410 uses the feedback signals received via the second link 450 to monitor the output current of the plurality of phases 430. The output current of each phase needs to be monitored in order to balance the current across all the phases, otherwise this might lead to excess power dissipation and power loss across the power stage 420.

In a specific embodiment, the first link 440 could be a digital interface (DIF) and the second link 450 could be an analog feedback link (IFB). In other embodiments, the controller 410 could be a distributed power unit (DPU) controller and the plurality of phases 430 could be a plurality of DPUs.

The controller 410 can further comprise an optional third port connected to a third link 460. In this case each phase is also connected to the controller 410 via the third link. The third link could be, for example, a bidirectional link. In such an embodiment, the controller 410 is configured to further generate a configuration signal which is transmittable to the plurality of phases via the third link 460. The third link 460 transports operational configuration conditions to the phases, for example to activate turn-of during a zero crossing detection of the inductor, or to set the current limit for the phase. In a specific embodiment, the third link could be a digital input-output (DIO). The DIO can allow for transportation of more complex control signals. Standard bidirectional, multi-devices bus can be used for that purpose.

The first link 440 transports a single, unidirectional control signal. The control signal is unidirectional, driven by the controller 410 and received by all phases in the plurality of phases 430. The control signal can be single-ended signal (1-wire) or differential signal (2-wires).

Figure 5:
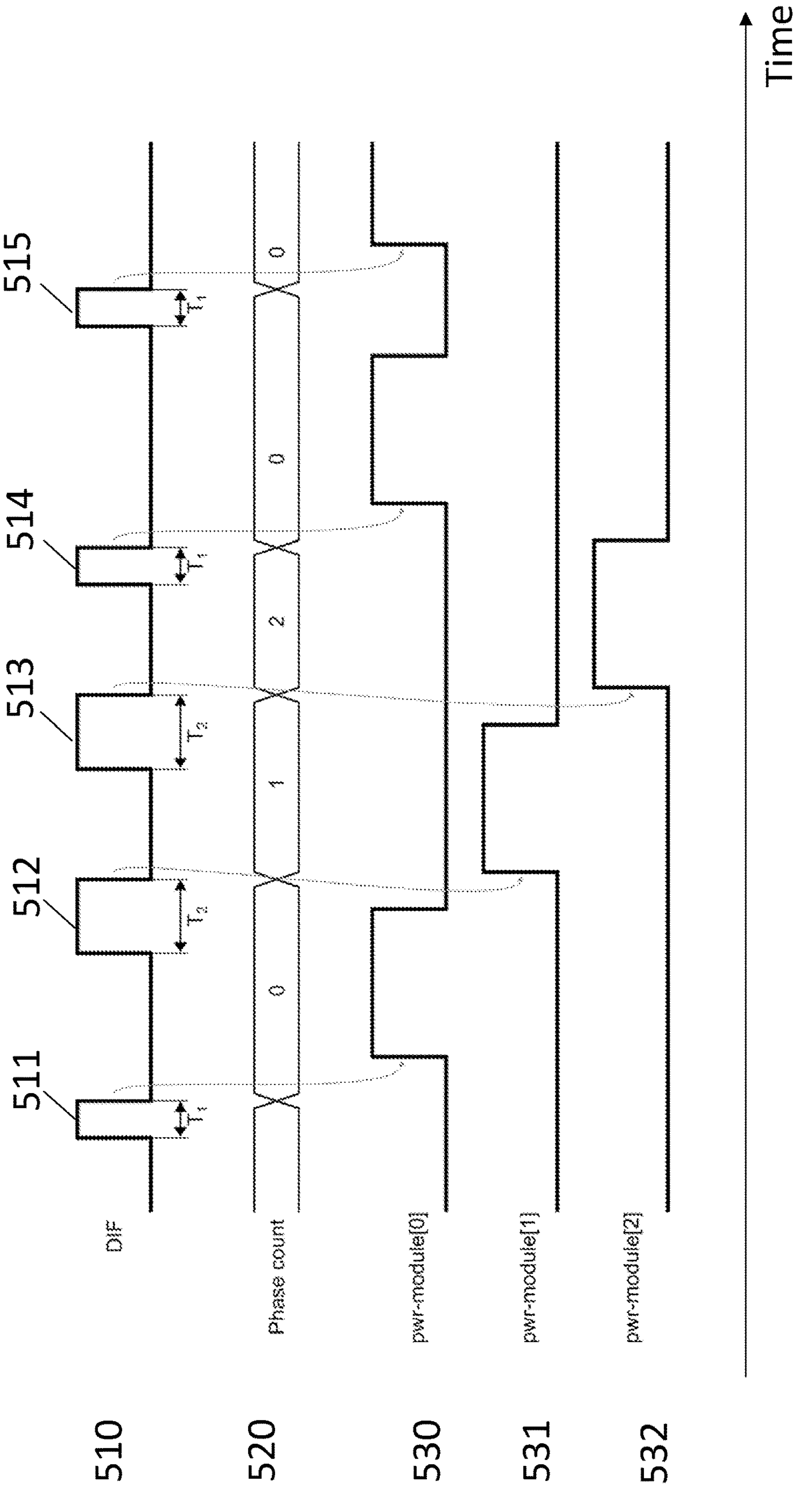
FIG. 5 is a waveform diagram illustrating an exemplary control signal that can be used to operate the power supply of FIG. 4.

FIG. 5 is a waveform diagram showing an exemplary control signal 510 that can be generated by the controller 410 in FIG. 4 for controlling a power stage 420 comprising a plurality N of phases 430-43N−1.

The control signal 510 reset state is at 0. The control signal 510 comprises a series of commands for the plurality of phases which are encoded using a pulse width. The control signal is formed of a sequence of pulses. The pulse width of each pulse may be used to perform specific phase activation or de-activation functionality. In FIG. 5, the control signal 510 is formed of a sequence of pulses labelled 511 to 515.

The first pulse 511 has a first pulse-width T1 which activates the first phase 430. The first pulse T1 triggers the activation of the phase which has an address 0 and resets the phase counter, phcount, to zero. The pulse-width of T1 may be chosen to be the smallest possible duration. The corresponding phcount for the example control signal 510 is shown with phase count 520 in FIG. 5.

The second pulse 512 has a second pulse-width T2 which activates additional phases incrementally. The second pulse 512 triggers the activation of the phase with address phcount +1. For example, if the current phcount is 0 then a T2 pulse would activate a phase with the address of 0+1=1; if the current phcount is 2 then a T2 pulse would activate a phase with the address of 2+1=3. The pulse-width T2 of 512 is chosen to be larger than the pulse-width T1 of 511 but should still be small enough in order to reduce latency in the response of the plurality of phases 430.

In a generic phase of operation, as the load applied to the power supply 400 increases, the number of phases that need to be activated will increase to account for the increase in load. Therefore, a control signal can have any configuration of T1 and T2 pulses. The phases detect the falling edge of the control signal and react according to the pulse-width detected. By setting the most critical controls T1 and T2 at the smallest pulse durations, critical latency is thus reduced. Once triggered, a phase generates an on-time conduction pulse.

In FIG. 5, the duty cycle waveforms for three phases is shown. The first phase 430 with address 0 is shown with 530, the second phase 431 with address 1 is shown with 531 and the third phase 432 with address 2 is shown with 532. The example control signal 510 is formed of a sequence of pulses 511, 512, 513 and 514. The pulse 511 of pulse with T1 activates the phase 430 with address 0. The pulse 512 (first T2 pulse width) activates the phase 431 with address 1 as seen by the on-time conduction pulse in the duty cycle 531. The pulse 513 (second T2 pulse width) corresponds to a phase count 520 of 2 and hence the phase 432 with address 2 is activated by the third pulse 513.

Additional pulses (not shown) may be used to perform different functionalities.

For instance, a de-activation pulse having a third pulse-width T3 may be used to de-activate all phases. The de-activation pulse sets all the power-stages in high impedance mode. It can be used for example when there is a sudden drop in load being applied to the power supply 400 and the plurality of phases 430 needs to be de-activated quickly. The de-activation pulse can also be used when large falling load transients require using a free-wheeling diode instead of a switch for higher dl/dt.

Another pulse referred to as address pulse, having a fourth pulse-width T4 may be used to initiate each phase to read its own address. The pulse-width T4 may be chosen to be relatively long compared with T1, T2 and T3. The address pulse triggers an address read sequence for all phases in the plurality of phases. In a normal mode of operation for the power supply 400, the address pulse would be sent out in a control signal generated by controller 410 when the power supply 400 is initialised for the first time. The address pulse is transmitted to the plurality of phases via the first link 440 which triggers a sequence of events that utilise the second link 450. A resistance connected via the first link for each phase can be used to read the phase address. Alternatively, the address resistance can be connected to via the second or third input for each phase. This is discussed further below.

The control signal 510 in FIG. 5 is just one example of how the different pulses can be configured. In general, the control signal can comprise one or more of the above pulses. In alternative embodiments, more pulses with different pulse-widths can be incorporated into the control signal to encode other instructions for the power stage 420.

Using, for example, a unidirectional link as the first link 440 to transmit the generated control signal allows for simplified input/output designs with reduced parasitic capacitance, lower power consumption and generally faster speed.

Figure 6:
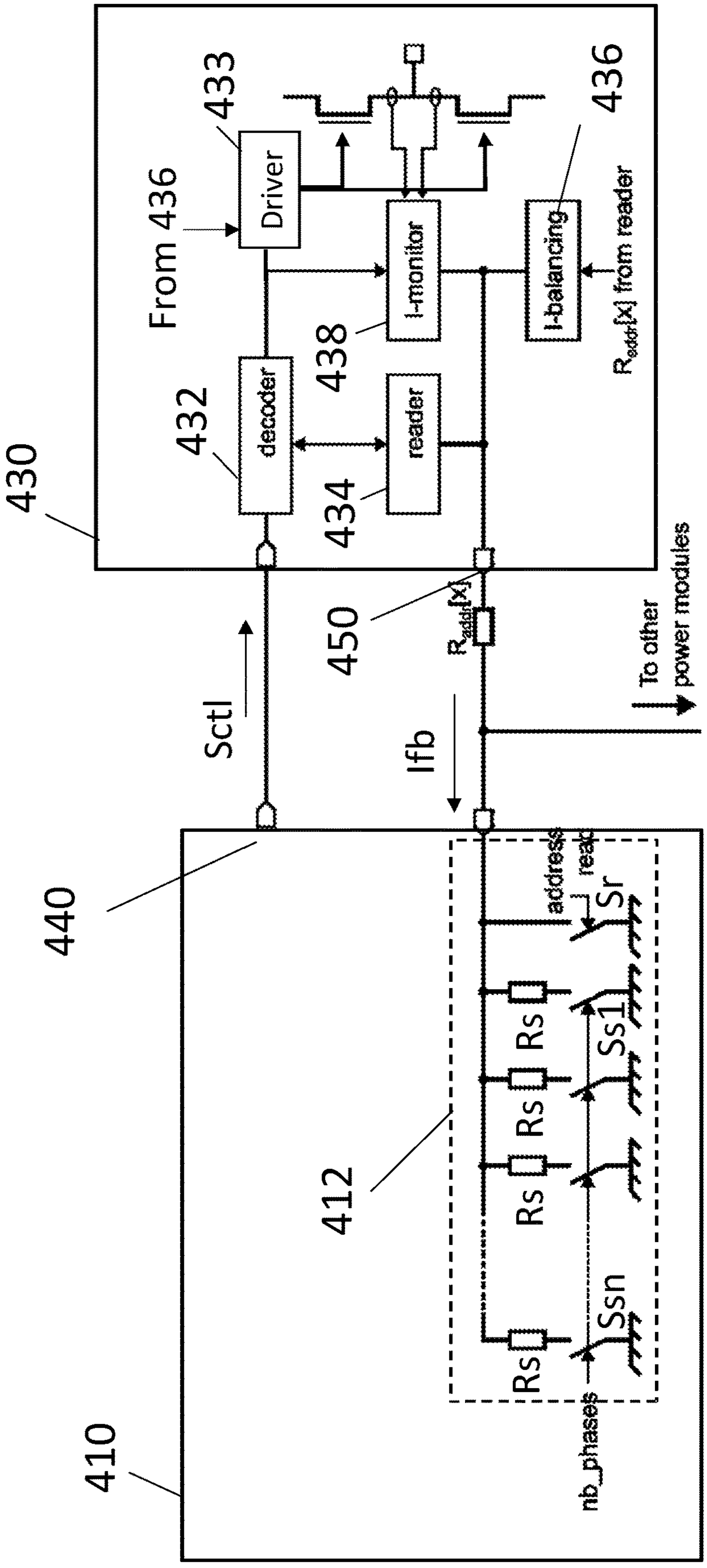
FIG. 6 is a circuit diagram of a controller and a phase from the system of FIG. 4.

FIG. 6 is a circuit diagram showing an example of the coupling between the controller 410 and one of the phases in the plurality of phases of FIG. 4.

The controller 410 comprises a resistance circuit 412 coupled to the second port that hosts the second link 450. The resistance circuit 412 has a plurality of resistances coupled in parallel, each resistance being connected to ground via a corresponding switch, referred to as sensing switch (Ss1-Ssn). The resistance circuit 412 further comprises an additional address read switch Sr, in FIG. 6, which is used for performing the address read functionality. The number of resistances in the resistance circuit 412 may be the same or greater than the number N phases. The sensing switches Ss1-Ssn are used to pull the corresponding resistance Rs to ground in order to change the equivalent sensing resistance Rs/n as a function of the number of active phase n. The address read switch Sr is used to make a short for the address read, as will be explained in more detail with reference to FIGS. 7A and 7B.

Each phase in the plurality N of phases comprises a decoder 432 coupled to the controller via the first link 440. Each phase further comprises an address reader 434 which is coupled to the decoder 432. The address reader 434 is also coupled to an address resistance $R_{addr}$ (also referred to as Ra) via the second link 450. Each phase also contains a current monitoring module 438 which receives an input from the decoder 432 and a current balancing module 436 which receives an input from the address reader 434. A driver 433 is also provided for driving the high side and low side power switches of a phase.

Each phase generates a feedback signal $I_{fb}$ that is proportional to the output current for that phase. All the feedback signals are summed at the second link port of the controller 410. The resistance circuit 412 performs the summation. By adjusting the number of active resistances in the resistance circuit 412 to match the number of active phases, the feedback signal voltage represents the average current per phase. The number of active resistances can be selected by passing a signal nb_phases generated by the controller 410 through the resistance circuit 412 to turn on or off a number of switches in the circuit. If, for example, the power supply 400 operates with a single phase and an output current Io, then only one resistance is connected to ground. In this case the feedback voltage would be Io/R where R is the value of the resistance in resistance circuit 412. If, the power supply 400 operates with four phases then the overall load current is 410 and four resistances are connected to ground, hence maintaining the feedback voltage at Io/R. This can be used by the phases for current balancing purposes. When triggered, the driver 433 drives the high-side switch for a duration referred to on-time Ton, that is a function of the input voltage and a pre-programmed parameter. The balancing circuit 436 is used to tune the Ton duration. If the feedback current from a single phase is greater than the average output current Io of all phases, then the current balancing module 436 sends a signal to the driver 433 to reduce the on-time Ton for the high side power switch. Conversely, if the feedback current from a single phase is lower than the average output current of all phases, then the current balancing module 436 sends a signal to the driver 433 to increase the on-time Ton for the high side power switch.

Each phase in the plurality of phases is allocated an individual address. In general, the allocated addresses start from 0 and are continuously allocated. The address read for the phases is done when the power supply 400 is first connected to power and is initiated when the decoder 432 receives and decodes the address pulse of pulse width T4. This initiates the address read sequence. The address read switch Sr is turned on and a current is passed through $R_{addr}$ to measure the voltage at that phase which will inform the phase of its own address. Each phase has its own $R_{addr}$ which is placed along the second link between the controller 410 and the phase. Each resistance for the address read is placed before the common node between the plurality of phases and the controller such that each phase reads its own resistance.

Figure 7A:
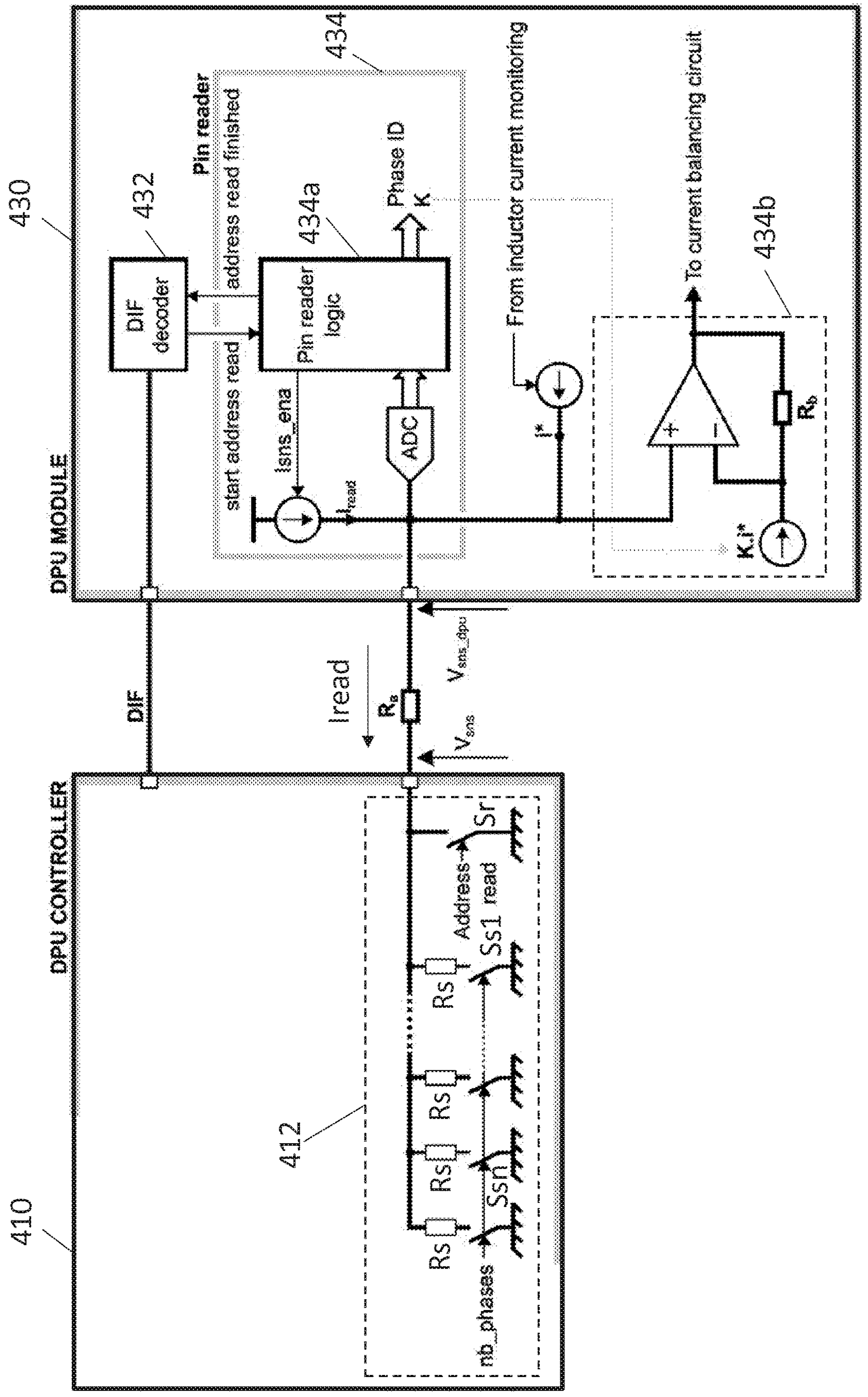
FIG. 7A is an example embodiment of the circuit that can be used to perform the address read of a phase.

FIG. 7A is a circuit diagram of showing an example embodiment of the address reader 434. The same components from earlier figures have been given the same labels and have the same meaning. The address reader 434 includes a logic circuit 434*a* which receives a decoded control signal from the decoder 432 initiating the read sequence of phase 430. The logic circuit 434*a* is coupled to the address resistance Ra via an ADC. The address reader 434 also includes a current source for providing a read current Iread. The logic circuit 434*a* is configured to provide an enable signal Isns_ena to turn on the current source.

An address read is performed by pushing the read current Iread through the address resistance $R_a$ and measuring the voltage across it: $V_{Ra}=V_{sns\text{-}dpu}-V_{sns}$. Iread is pushed through Ra when Isns_ena=1, otherwise Iread=0. The address reader 434 can only measure the phase voltage $V_{sns\text{-}dpu}$ relative to the ground, therefore the resistance circuit 412 of controller 410 switch on Sr to short-circuit the current sense resistance $R_s/n$ and hence pull the control voltage $V_{sns}$ to ground. The read current $I_{read}$ which has a pre-set and known value, is forced through the address resistance $R_a$ by the address reader 434 whilst $V_{sns}$ is pulled to ground. The phase voltage is then given by: $V_{sns\text{-}dpu}=R_a I_{read}$. To determine $R_a$ and hence the address of the phase, the analog-to-digital converter ADC in the address reader 434 measures $V_{sns\text{-}dpu}$ and as $I_{read}$ is known the address can be determined: $R_a=V_{sns\text{-}dpu}/I_{read}$.

During the address reading operation, the phase is not delivering power. The current i* is a measure of the output current of the phase, therefore in address read operation i*=0. Outside of the address read, the current $I_{read}$ is deactivated and the current i* is proportional to the output current of the phase and the voltage at the control circuit 412 is given by: $V_{sns}=R_s i^*$. For power stages with multiple phases connected in parallel, then the voltage is given by: $V_{sns}=R_s/n\times(i^*_1+i^*_2+\ldots i^*_n)=(Rs/n)i^*_{total}$ where n is the number of phases the power stage is comprised of. Each phase can compare its own output current against the average load current by measuring $V_{sns\text{-}dpu}=R_a i^*+(R_s/n)i^*_{total}$. The error generated through resistance $R_a$ during modes of operation that are not address read operations can be compensated for through compensator 434*b*. In this example the compensator 434*b* is formed current-controller voltage shifter using an operational amplifier which outputs: $V_{sns\text{-}dpu}-(R_b K i^*)$, in which $R_b$ is an arbitrary resistance value and K is a multiplication factor which is a function of the address read resistance $R_a$. Hence the output of compensator 434*b* is: $R_a i^*+(R_s/n)i^*_{total}-Ki^*R_b$. Therefore, the error introduced by address resistance $R_a$ can be removed by setting $K=R_a/R_b$.

Figure 7B:
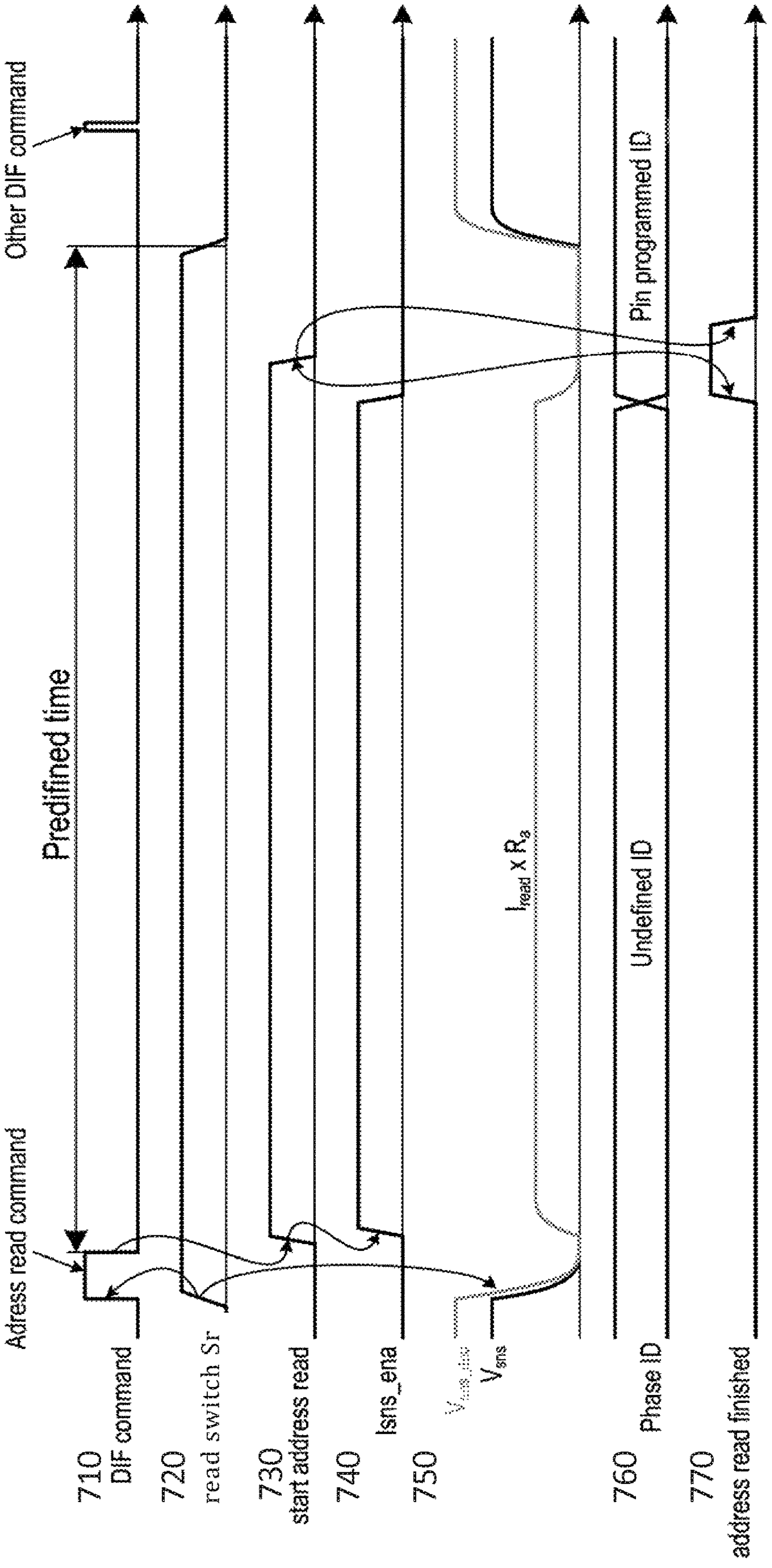
FIG. 7B is a waveform diagram illustrating an address read control signal that can be used to read the address of a phase of FIG. 4.

FIG. 7B is a waveform diagram showing the signals sent and received in the address reader circuit 434 of FIG. 7A during an address reader sequence. The control signal 710 is received by the decoder 432 which contains pulse T4. The address read switch Sr is turned on at the start of pulse T4 as can be seen by waveform 720. The decoder 432 provides signal 730 to the logic circuit 434*a* to start address read and assert the enable signal Isns_ena 740. The read current $I_{read}$ passes through the address resistance and maintains a constant value, and the voltage 750 can be measured. The measurement can be performed by an Analog to Digital Converter, or even a few comparators comparing the voltage against a few fixed reference voltages. The voltage measured across the address resistance gives the address of the phase in question. The waveform 760 indicates that the phase has an unidentified ID until address reader 434 has finished measuring the voltage. This point is indicated with waveform 770. At this point, the reader logic 434*a* generates a different pulse indicating that the address of the phase has been read at which point the address read switch Sr is turned off. If the sensing switches were turned off, they can be turn on again. The phase is now ready to receive a further commands through the control signal 710. In alternative embodiments, the pulse 770 is not required as the address read sequence can be set to end after a predetermined time, at the end of which the address will have been read.

Connecting a resistance with a value readable by an address reader to the first link may lead to increased latency and degradation of the pulse-width decoding performance of decoder 432. Instead, the second link is used. This link is designed to be slow, and the second link input of the control circuit can be pulled low with a large transistor without degrading the interface.

Using $R_{addr}$ for the address reading introduces an additional error to the phase balancing system required to balance the different power-module loading of the system. Therefore, the current balancing module 436 is configured to take into account the additional voltage error introduced by $R_{addr}$ when balancing the feedback signal across all the plurality of phases 430.

The decoder 432 is configured to decode the control signal. It measures the pulse-width of each pulse in the control signal and performs an associated protocol based on this measurement.

Figure 8A:
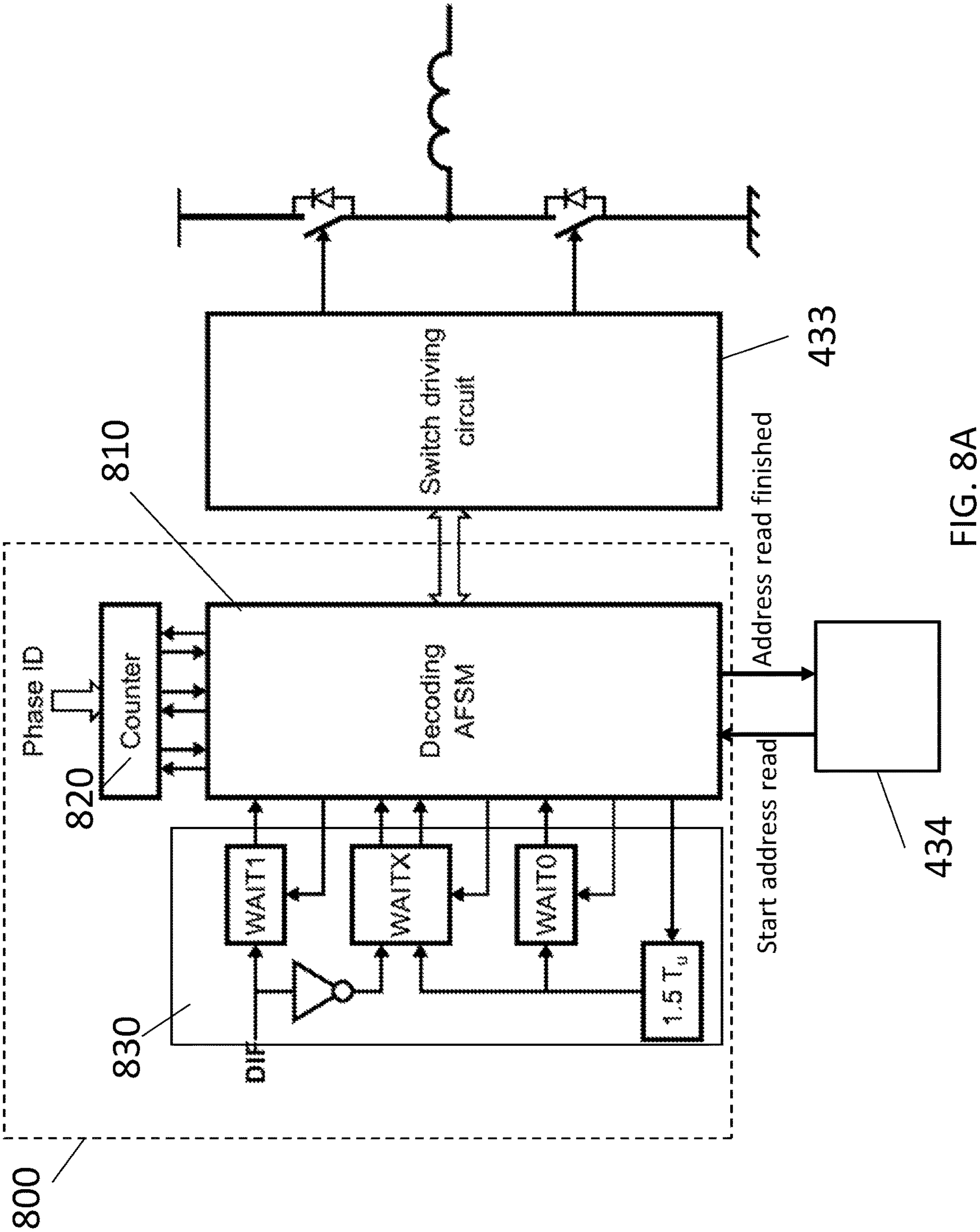
FIG. 8A is an example embodiment of the decoder of FIG. 6.
Figure 9A:
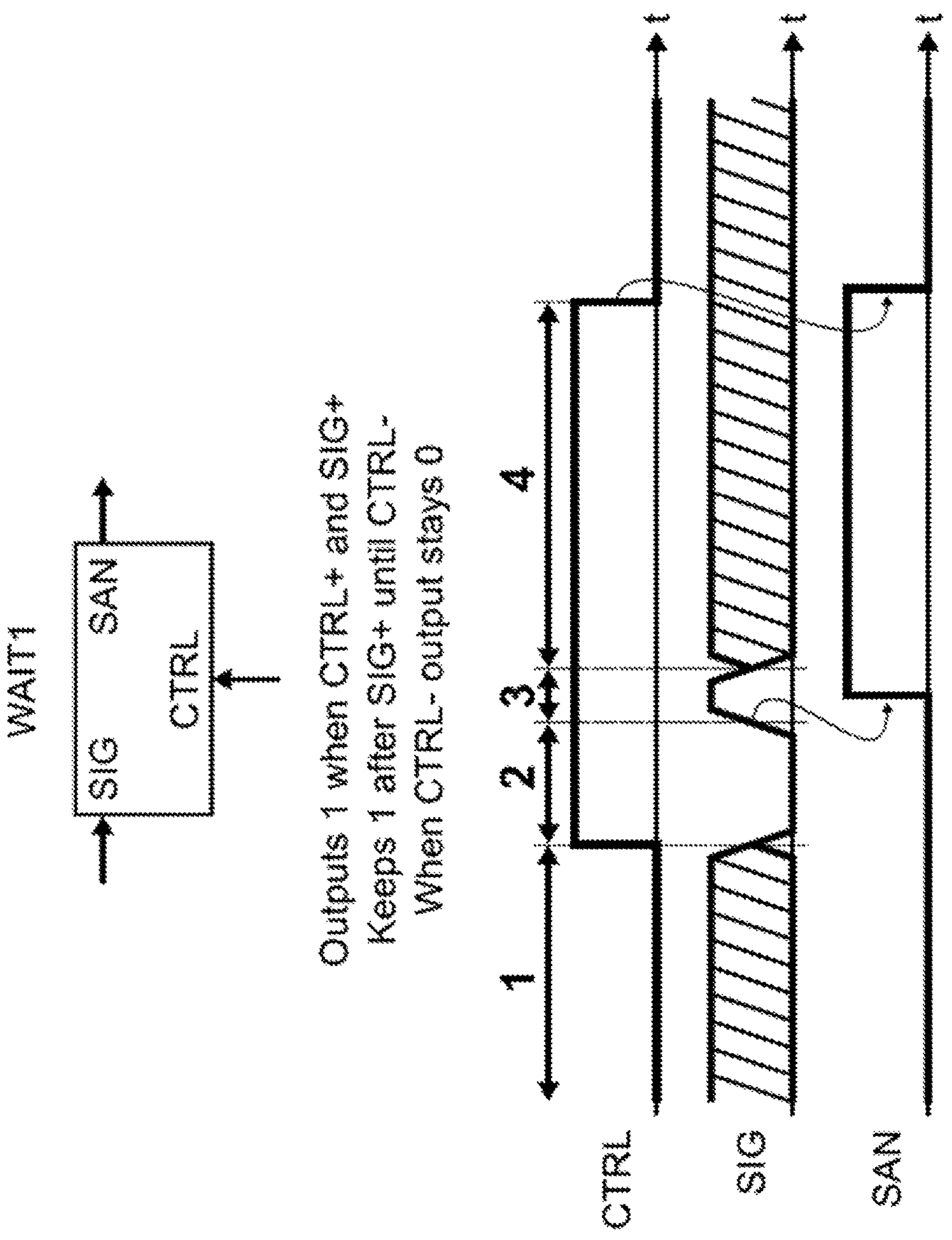
FIG. 9A is a schematic diagram illustrating the operation of a first wait cell for use in the circuit of FIG. 8A.
Figure 9B:
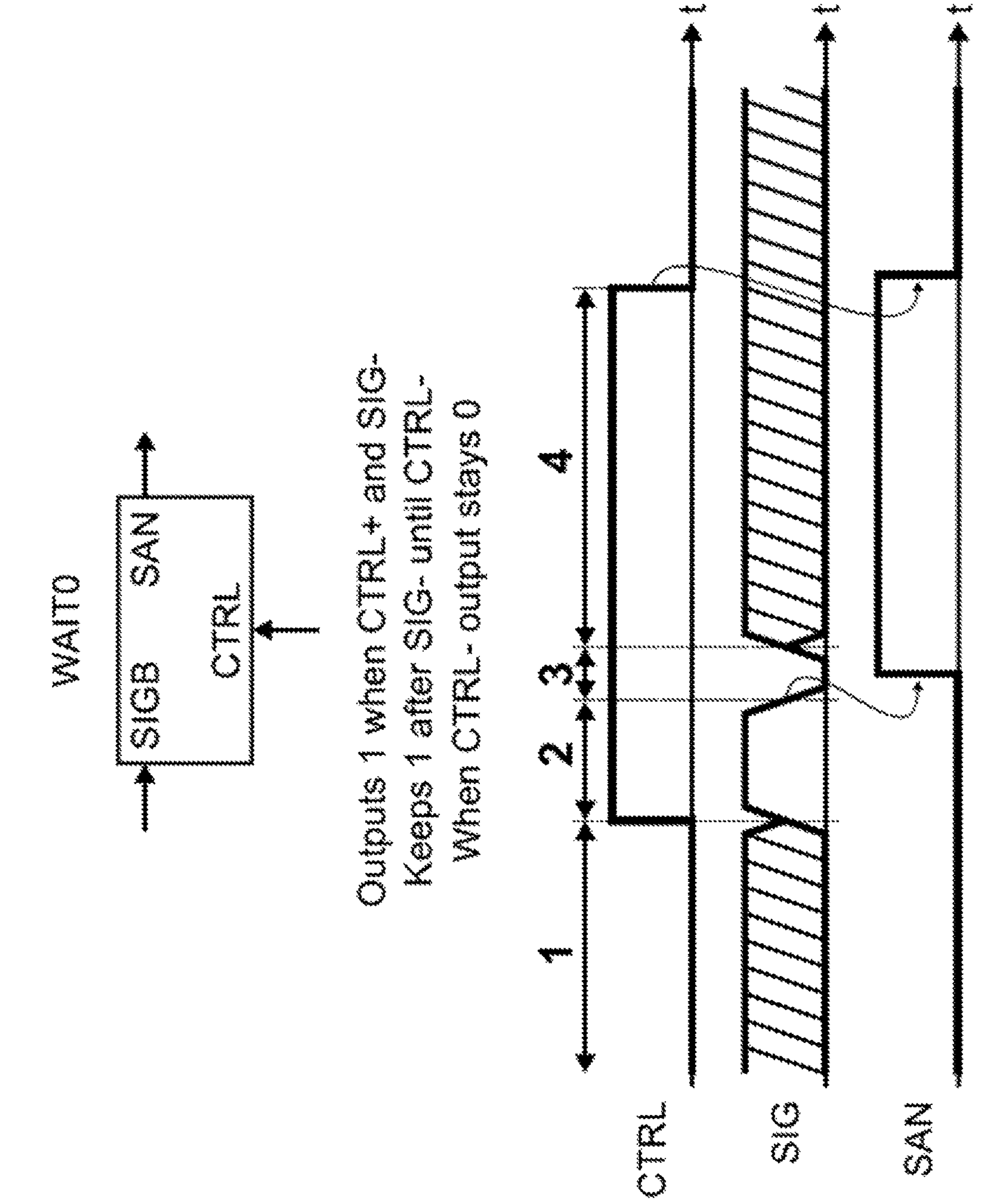
FIG. 9B is a schematic diagram illustrating the operation of a second wait cell for use in the circuit of FIG. 8A.
Figure 9C:
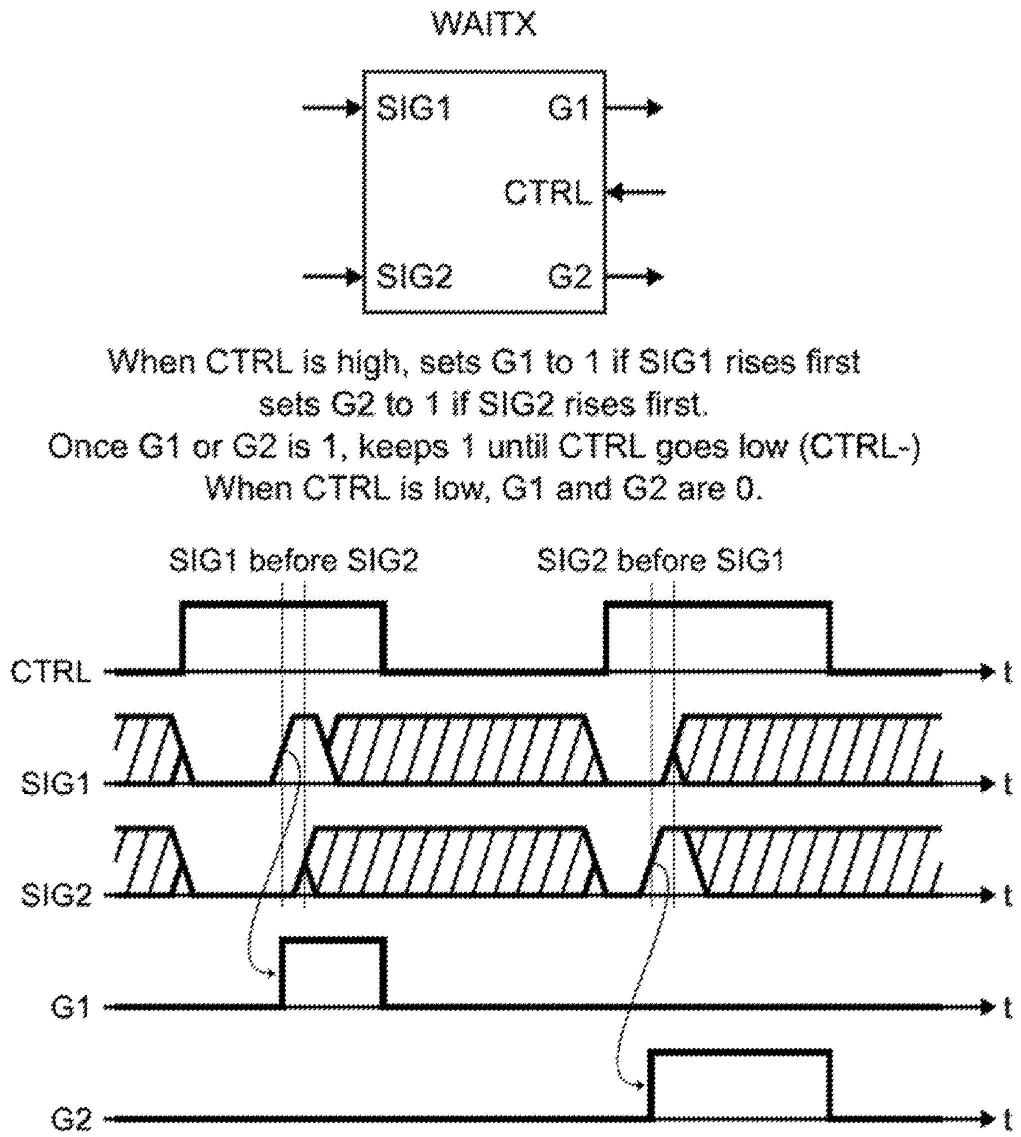
FIG. 9C is a schematic diagram illustrating the operation of an arbiter for use in the circuit of FIG. 8A.

FIG. 8A is an example implementation of a decoder 800 coupled to a driver 433 for driving the high side and low side power switches of a phase. The decoder 800 comprises a decoding asynchronous finite state machine (AFSM) 810 coupled to a counter or phase counter 820 and to a logic circuit 830. The logic circuit 830 includes an arbiter labelled WAITX and two wait cells labelled WAIT1 and WAIT0. The logic circuit 830 is implemented as part of the decoder to mitigate undesirable effects due to glitches or non-persistent signals. The arbiter WAITX, and the wait cells WAIT1 and WAIT0 are used as sanitization circuits. The circuits for the arbiter and the wait cells are shown in FIGS. 9A, 9B and 9C. Example implementations of the arbiter and wait cells are described in. Khomenko, D. Sokolov, A. Mokhov and A. Yakovlev, "WAITX: An Arbiter for Non-persistent Signals," 2017 23rd IEEE International Symposium on Asynchronous Circuits and Systems (ASYNC), San Diego, CA, USA, 2017. A brief description is provided here. For cell WAIT1, the output is asserted when the input to the cell is 1. The output will also have a value of 1 and the output will remain at this value even if the input value becomes greater than 1. Once WAIT1 is disabled, no output is produced. Similarly, cell WAIT0 waits for the input to become 1 after being enabled. WAITX receives two inputs and waits for either input to become 1 after being enabled. However, the arbiter WAITX only allows for an input of 1 to pass through. After being enabled, the first input that becomes 1 is kept and passed through the waitx until the waitx is disabled.

In operation, the decoder 800 receives a control signal from the controller 410 at the input of the logic circuit 830, which is transmitted to the decoding AFSM 810. The AFSM 810 is configured to decode the control signal through a decoding protocol. The decoding AFSM 810 then updates the switch driving circuit 433 and the counter 820. The decoder 800 represents an example implementation of the decoder 432 of FIGS. 6 and 7*a* and therefore operates in the same way.

Figure 8B:
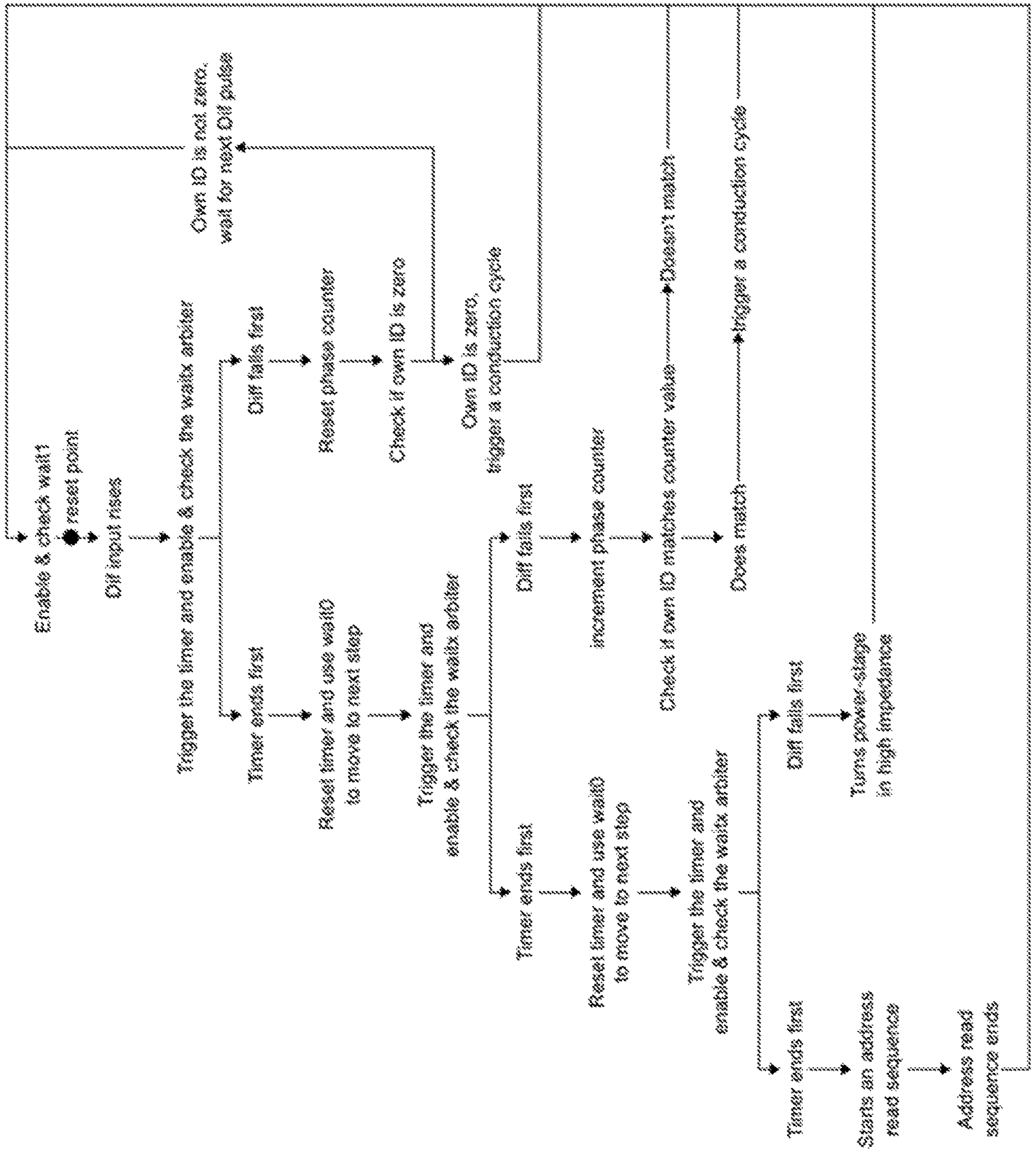
FIG. 8B is an example of the protocols the decoder of FIG. 7A uses.

FIG. 8B is a flow chart, also called a signal transition graph (STG), of a decoding protocol executed by the decoding AFSM 810. This flow chart provides instructions on how to execute any one of the pulses having pulse width T1, T2, T3, or T4 of the control signal.

The controller of the disclosure allows better control of the plurality N of phases 430-43N−1 switching through the first link combined with a simple but effective current balance and monitoring system through the shared feedback signal transmitted via the second link. Optionally, the controller may also include a comprehensive configuration for the whole power system 400 through the third link. The combination of the first and second link can be used for address reading of the power modules/phases without added pin count. The reduced pin count reduces the cost associated with the pins of the power module and reduces the pin congestion of the PMIC embedding the control circuit.

FIG. 9A is a schematic diagram illustrating the operation of a first wait cell for use in the circuit of FIG. 8A.

FIG. 9B is a schematic diagram illustrating the operation of a second wait cell for use in the circuit of FIG. 8A.

FIG. 9C is a schematic diagram illustrating the operation of an arbiter for use in the circuit of FIG. 8A.

A skilled person will appreciate that variations of the disclosed arrangements are possible without departing from the disclosure. Accordingly, the above description of the specific embodiments is made by way of example only and not for the purposes of limitation. It will be clear to the skilled person that minor modifications may be made without significant changes to the operation described.

The invention claimed is:

1. A controller for controlling a power stage having a plurality of phases, the controller being configured to:

generate a control signal;

send the control signal to the plurality of phases via a first link;

receive from each phase a feedback signal via a second link;

sum feedback signals received from each phase at a resistance circuit having a plurality of resistances coupled in parallel, each resistance being connected to ground via a corresponding switch; and derive an average current per phase.

2. The controller as claimed in claim 1, having a first port connected to the first link and a second port connected to the second link, and the resistance circuit coupled to the second port.

3. The controller as claimed in claim 1, wherein the resistance circuit comprises an additional switch for performing a phase address reading functionality.

4. The controller as claimed in claim 1, wherein the control signal comprises one or more of:

a first pulse having a first pulse-width for activating a first phase;

a second pulse having a second pulse-width for activating additional phases incrementally;

a third pulse having a third pulse-width for de-activating all phases; and a fourth pulse having a fourth pulse-width for initiating each phase to read its own address.

5. The controller as claimed in claim 1, wherein the first link and the second link are unidirectional links.

6. The controller as claimed in claim 1, wherein a sum of the feedback signals is proportional to an output current generated by the plurality of phases.

7. The controller as claimed in claim 1, wherein the controller is further configured to generate a configuration signal for configuring one or more phases, the configuration signal being transmittable via a third link.

8. A power supply comprising the controller as claimed in claim 1, coupled to a power stage having a plurality of phases.

9. The power supply as claimed in claim 8, wherein the first link is a single wire interface that couples the controller to the power stage.

10. The power supply as claimed in claim 8, wherein each phase comprises a decoder for decoding the control signal.

11. The power supply as claimed in claim 10, wherein the decoder comprises a finite state machine coupled to a phase counter and a logic circuit and the finite state machine is configured to execute a decoding protocol.

12. The power supply as claimed in claim 11, wherein the logic circuit comprises an arbiter coupled to one or more wait cells.

13. The power supply as claimed in claim 10, wherein the decoder is configured to measure a pulse width of each pulse in the control signal; and perform an associated protocol based on the measurement.

14. The power supply as claimed in claim 8, wherein each phase comprises an address reader configured to read an address of the phase by sending a current through an address resistance.

15. The power supply as claimed in claim 14, wherein the address reader comprises a logic circuit configured to initiate a read sequence.

16. The power supply as claimed in claim 15, wherein the address reader comprises a compensator circuit configured to compensate for an error generated by the address resistance.

17. A method of controlling a power stage having a plurality of phases, the method comprising:

generating a control signal comprising a series of pulses;

sending the control signal to the plurality of phases via a first link;

for each phase decoding the control signal and activating or de-activating the phase based on the control signal;

receiving via a second link a feedback signal from each phase;

summing feedback signals received from each phase at a resistance circuit having a plurality of resistances coupled in parallel, each resistance being connected to ground via a corresponding switch; and deriving an average current per phase.

18. The method as claimed in claim 17, wherein the control signal comprises one or more of:

a first pulse having a first pulse width for activating a first phase;

a second pulse having a second pulse width for activating additional phases incrementally;

a third pulse having a third pulse width for de-activating all phases; and a fourth pulse having a fourth pulse width for initiating each phase to read its own address.

* * * * *